(12) United States Patent
Lee

(10) Patent No.: US 9,554,018 B2
(45) Date of Patent: Jan. 24, 2017

(54) IMAGE FORMING APPARATUS AND CONTROLLING METHOD THEREOF

(71) Applicant: Samsung Electronics Co., Ltd, Suwon-si, Gyeonggi-do (KR)

(72) Inventor: Ui Choon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/464,958

(22) Filed: Aug. 21, 2014

(65) Prior Publication Data

US 2015/0055149 A1   Feb. 26, 2015

Related U.S. Application Data

(60) Provisional application No. 61/869,128, filed on Aug. 23, 2013.

(30) Foreign Application Priority Data

Aug. 23, 2013   (KR) .......................... 10-2013-0100621

(51) Int. Cl.
    *H04N 1/46*   (2006.01)
(52) U.S. Cl.
    CPC ........................................ *H04N 1/46* (2013.01)
(58) Field of Classification Search
    USPC ....................... 358/1.12, 1.15, 1.18, 1.13, 498
    See application file for complete search history.

(56) References Cited

U.S. PATENT DOCUMENTS

| | | | | |
|---|---|---|---|---|
| 4,460,269 A | * | 7/1984 | Yamazaki | G03B 27/625 399/17 |
| 2003/0223780 A1 | * | 12/2003 | Kobayashi | G03G 15/5095 399/196 |
| 2009/0116857 A1 | * | 5/2009 | Tanaka | G03G 15/6538 399/23 |
| 2009/0141307 A1 | * | 6/2009 | Slijp | H04N 1/00225 358/1.15 |
| 2009/0310159 A1 | * | 12/2009 | Yokobori | G03G 15/6538 358/1.9 |
| 2011/0013240 A1 | * | 1/2011 | Kobayashi | B65H 7/02 358/498 |
| 2012/0287455 A1 | * | 11/2012 | Sawano | H04N 1/00015 358/1.13 |

(Continued)

*Primary Examiner* — Jerome Grant, II
(74) *Attorney, Agent, or Firm* — Staas & Halsey LLP

(57) ABSTRACT

An image forming apparatus includes an image obtaining unit configured to obtain an image of a document, a document supplying unit configured to supply a document to the image obtaining unit, an image forming unit configured to form the image on a printing medium, a storing unit configured to store supply status information of the document, and a controller configured to perform a preparation for an image forming operation in response to at least one of the document being supplied to one of the image obtaining unit and the document supplying unit and an option setting command of the image forming operation being input. The controller, in response to the option setting command being input after the preparation for the image forming operation is stopped, is configured to perform the preparation for the image forming operation again based on the supply status information of the document.

26 Claims, 12 Drawing Sheets

(56) References Cited

U.S. PATENT DOCUMENTS

| | | | |
|---|---|---|---|
| 2013/0215481 A1* | 8/2013 | Hayasaka | G03G 15/607 358/498 |
| 2014/0093293 A1* | 4/2014 | Yamaguchi | G03G 21/00 399/341 |

* cited by examiner

IMAGE FORMING APPARATUS AND CONTROLLING METHOD THEREOF

CROSS-REFERENCE TO RELATED APPLICATIONS

This application claims the benefit of priority under 35 U.S.C. §119 to Provisional Application No. 61/869,128, filed on Aug. 23, 2013, and Korean Patent Application No. 2013-0100621, filed on Aug. 23, 2013, the content of which is incorporated herein in its entirety by reference.

BACKGROUND OF THE INVENTION

1. Field of the Invention

Embodiments of the inventive concept relate to an image forming apparatus and a control method thereof, and more particularly, to an image forming apparatus configured to execute a first image forming operation in a swift manner by executing an image forming preparation operation, and a control method thereof.

2. Description of the Related Art

An image forming apparatus such as, for example, a photocopier, a printer, or a multifunctional apparatus is configured to enter a power saving mode or a sleep mode within a predetermined time in order to save energy after a certain time has passed in a state in which a user has not used the image forming apparatus.

In response to an input from a user of a photocopy command during the power saving mode or the sleep mode, the image forming apparatus performs an image forming preparation operation to form an image, and when the preparation to form an image has been completed, a photocopy operation is performed. Unfortunately, this first image forming operation is not performed in a swift manner. Additionally, as the first image forming operation is slowed down, the time for a user to wait after inputting the photocopy command before receiving the image is extended.

To solve this difficulty, a conventional image forming apparatus is provided with a way to enhance the speed of the first image forming operation, after a user inputs the photocopy command, by executing an image forming preparation operation when a user that has a document prepared to be photocopied is detected.

However, in a case in which the photocopy command has not been input by a user within a predetermined time after the document has been prepared to be photocopied, the image forming apparatus enters into a standby mode. In this case, when a user inputs a photocopy command, the image forming apparatus again must perform an image forming preparation operation.

SUMMARY OF THE INVENTION

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a method of controlling an image forming apparatus including preparing for an image forming operation in response to a document being supplied to an image obtaining unit or a document supplying unit, and standing by for an input of an image forming command, storing supply status information of the document in response to the image forming command not being input within a reference period of time, and stopping the preparing for the image forming operation, determining whether the document is supplied based on the supply status information of the document in response to an option setting command of the image forming operation being input after the preparing for the image forming operation is stopped, and preparing for the image forming operation again in response to a result of the determining being that the document is supplied.

The supply status information of the document may include at least one of whether a flatbed cover is open and whether the document is positioned at a document tray of the document supplying unit.

The option setting command may include a printing medium selection command configured to select a printing medium on which an image is to be formed.

The option setting command may include an enlarge/reduce command configured to input an enlargement command of an image or a reduction command of the image.

The option setting command may include a color mode selection command to choose one of a color mode to form a color image, a mono mode to form a black/white image, and an automatic color mode to automatically form the color image or the black/white image.

The preparing for the image forming operation may include executing an Auto Color Registration (ACR) operation.

The preparing for the image forming operation may further include stopping the Auto Color Registration (ACR) operation in response to a selection of a mono mode configured to form a black/white image.

The preparing for the image forming operation may include executing a Tone Recursive Control (TRC).

The preparing for the image forming operation may include driving a Laser Scanning Unit (LSU).

The preparing for the image forming operation may include pre-warming a fixing unit.

The foregoing and/or other features and utilities of the present inventive concept also provide an image forming apparatus including an image obtaining unit, a document supplying unit, an image forming unit, a storing unit, and a controller. The image obtaining unit may be configured to obtain an image of a document. The document supplying unit may be configured to supply a document to the image obtaining unit. The image forming unit may be configured to form the image on a printing medium. The storing unit may be configured to store supply status information of the document. The controller may be configured to perform a preparation for an image forming operation in response to at least one of the document being supplied to one of the image obtaining unit and the document supplying unit and an option setting command of the image forming operation being input. The controller, in response to the option setting command of the image forming operation being input after the preparation for the image forming operation is stopped, may be configured to perform the preparation for the image forming operation again based on the supply status information of the document.

The supply status information of the document may include at least one of whether a flatbed cover configured to shield the image obtaining unit from an outside light is open and whether the document is positioned at a document tray of the document supplying unit.

The option setting command may include a printing medium selection command configured to select a printing medium on which the image is to be formed.

The option setting command may include an enlarge/reduce command configured to input an enlargement command of the image or a reduction command of the image.

The option setting command may include a color mode selection command to choose one of a color mode to form a color image, a mono mode to form a black/white image, and an automatic color mode to automatically form the color image or the black/white image.

The controller may be configured to perform the preparation for the image forming operation by executing an Auto Color Registration (ACR) operation.

The controller may be configured to stop the Auto Color Registration (ACR) operation in response to a selection of a mono mode configured to form a black/white image.

The controller may be configured to perform the preparation for the image forming operation by executing a Tone Recursive Control (TRC) operation.

The controller may be configured to perform the preparation for the image forming operation by driving a Laser Scanning Unit (LSU).

The controller may be configured to perform the preparation for the image forming operation by pre-warming the fixing unit configured.

The foregoing and/or other features and utilities of the present inventive concept also provide a method of converting an image forming apparatus between a standby mode and an active mode including changing from the standby mode to the active mode in response to an event at the image forming apparatus, performing a preparation operation for an image forming operation, and changing from the active mode to the standby mode in response to a lack of a receipt of a photocopy command for a period of time since the event being greater than a reference period of time.

The event may be a determination of a receipt of a photocopy setting command.

The method may further include making a determination of a preparation of a document to be photocopied.

The making may occur before the changing from the standby mode to the active mode.

The method may further include presenting a warning to a user in response to the determination of the preparation being a lack of preparation.

The event may be a determination that a flatbed cover of the image forming apparatus is open.

The event may be a determination that a document is inserted into an automatic document supplying unit of the image forming apparatus.

The method may further include storing document preparation information in a storing unit of the image forming apparatus.

The storing may occur before the changing from the active mode to the standby mode.

The foregoing and/or other features and utilities of the present inventive concept also provide a non-transitory computer-readable recording medium containing instructions which, when executed by an electronic control unit, cause the electronic control unit to perform changing from the standby mode to the active mode in response to an event at the image forming apparatus, performing a preparation operation for an image forming operation, and changing from the active mode to the standby mode in response to a lack of a receipt of a photocopy command for a period of time since the event being greater than a reference period of time.

As is apparent from the above, in response to a user inputting a photocopy setting command configured to set a photocopy option, the image forming apparatus may be able to perform a first image forming operation in a swift manner by executing a preparation operation to form an image.

In addition, the image forming apparatus, in response to a user inputting a photocopy setting command in a state in which a document is not prepared, may prevent an image forming preparation operation from being performed by warning the user that the document is not prepared.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
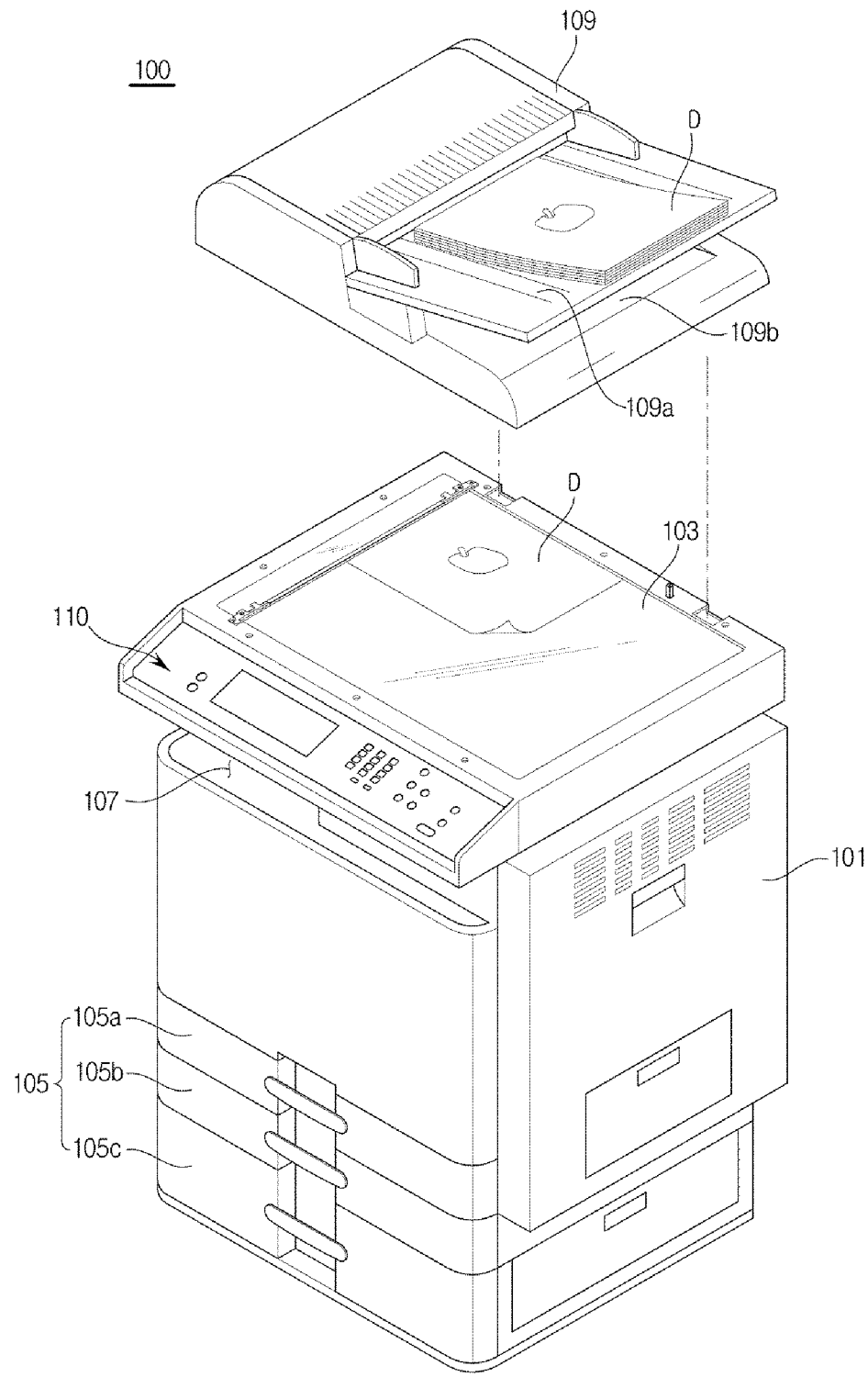
FIG. 1 is a perspective view illustrating an exterior appearance of an image forming apparatus in accordance with an embodiment of the present inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a perspective view illustrating an exterior appearance of an image forming apparatus 100 in accordance with an embodiment of the present inventive concept.

Referring to FIG. 1, the image forming apparatus 100 may include a body 101 to form an exterior appearance of the image forming apparatus 100, and a flatbed cover 109 provided at an upper surface of the body 101.

At an upper portion thereof, the body 101 may be provided with a flatbed 103 that has a transparent material where a document D may be positioned so that the image forming apparatus 100 may be able to obtain an image of the document D. At a lower portion thereof, the body 101 may be provided with a printing medium container 105 to store a printing medium to which an image of the document D may be transferred. At an upper side of a central portion thereof, the body 101 may be provided with an exit tray 107 to which the printing medium that has an image of the document D may be transferred. The printing medium container 105 may include a first printing medium container 105a, a second printing medium container 105b, and a third printing medium container 105c in which different sized printing media may be stored, respectively.

The flatbed cover 109 may have one side thereof rotatably provided at an upper portion of the body 101 through a hinge 109c (see FIG. 3), and may serve to prevent the flatbed 103 and the document D from being exposed to an outside at a time of when the image forming apparatus 100 obtains an image of the document D provided at the flatbed 103.

In addition, the flatbed cover 109 may be provided with an Auto Document Feeder (ADF), which is described below, so that the image forming apparatus 100 may be able to obtain a large quantity of images of the documents D. The flatbed cover 109 may include a document tray 109a, configured to accommodate the large quantity of the documents D, and a document exit tray 109b, at which the document D that has an image formed thereon may be exited from the image forming apparatus 100.

Figure 2:
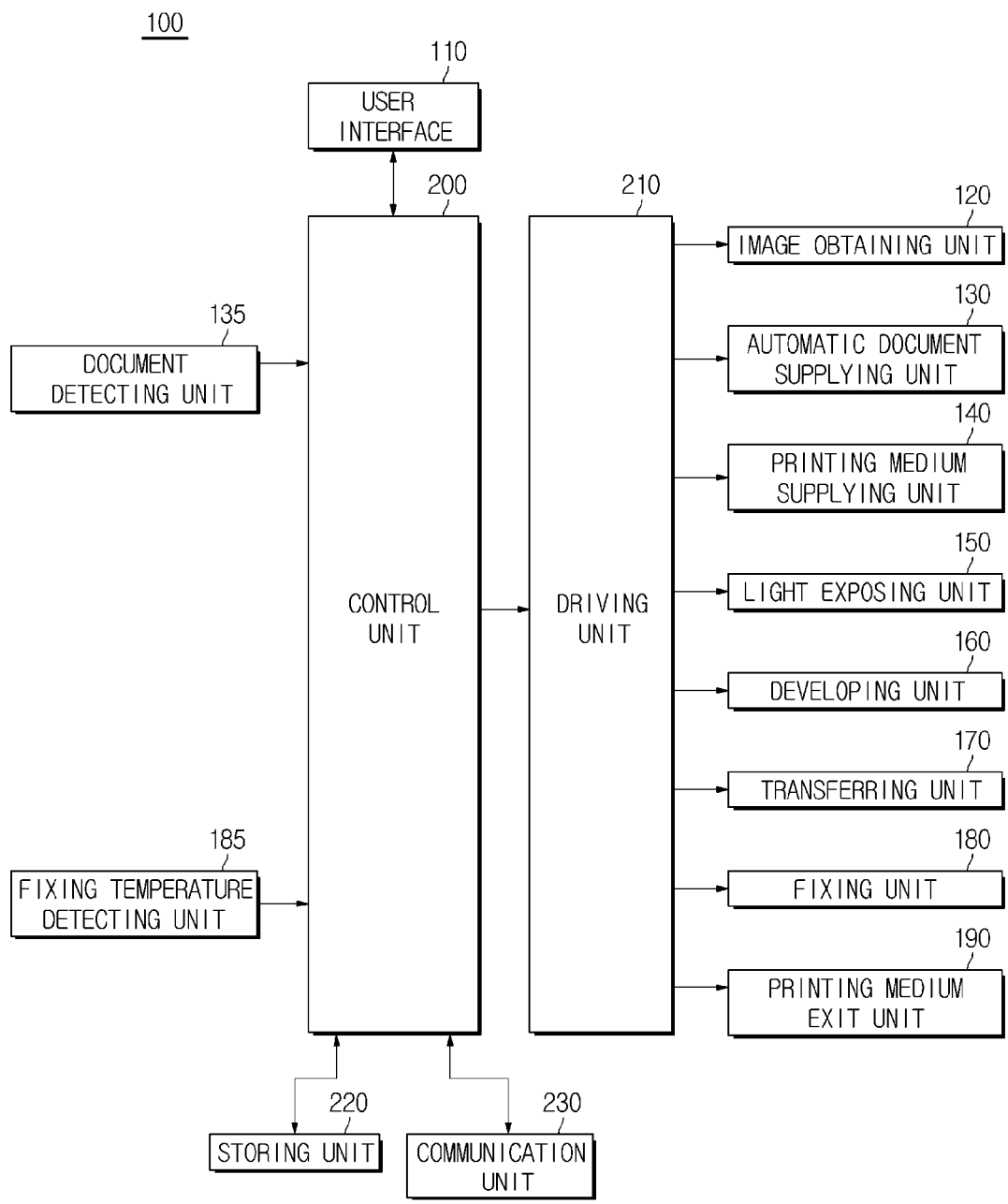
FIG. 2 is a block diagram illustrating a control flow of the image forming apparatus in accordance with an embodiment of the present inventive concept.
Figure 3:
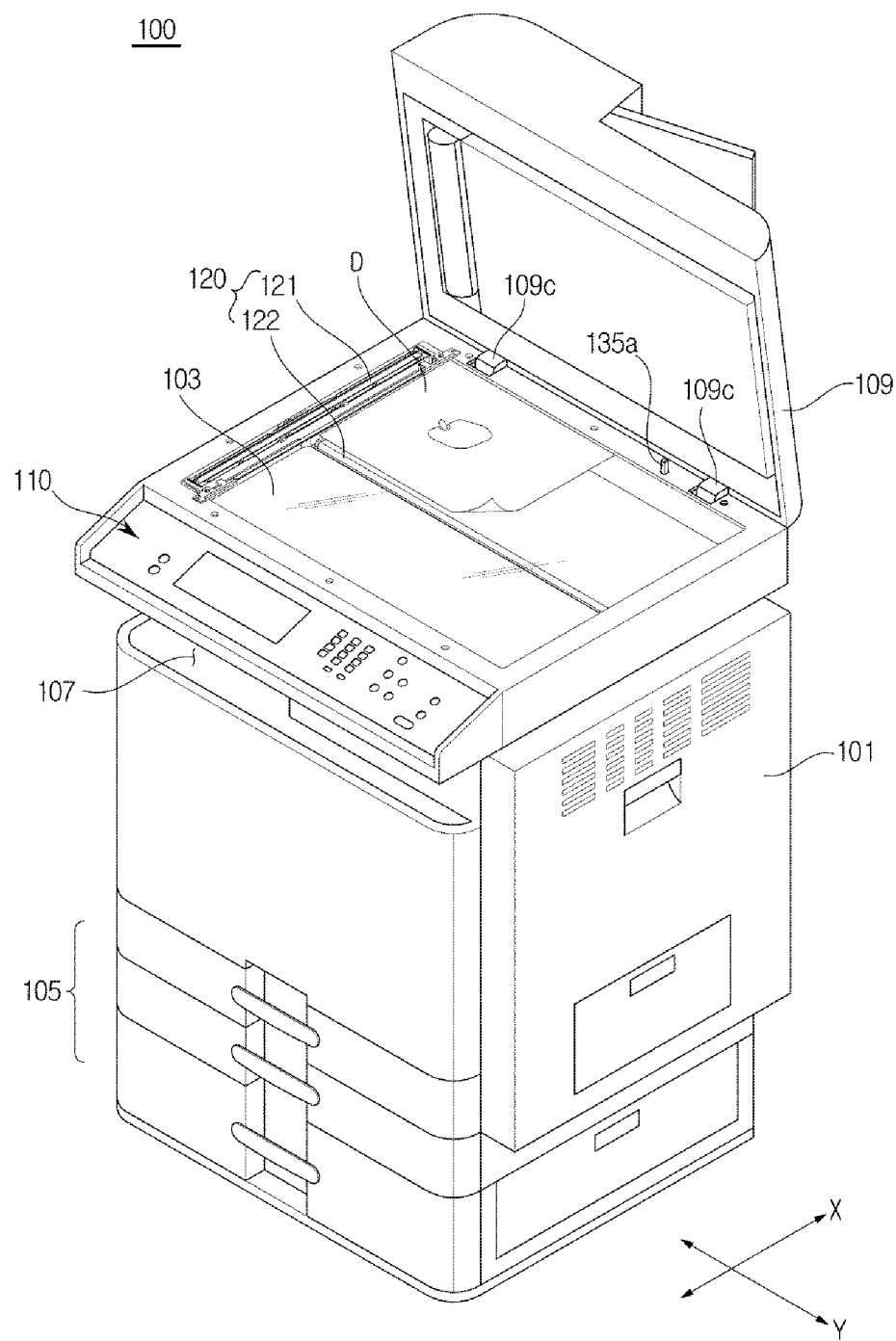
FIG. 3 is a perspective view illustrating an image obtaining unit of the image forming apparatus in accordance with an embodiment of the present inventive concept.
Figure 4:
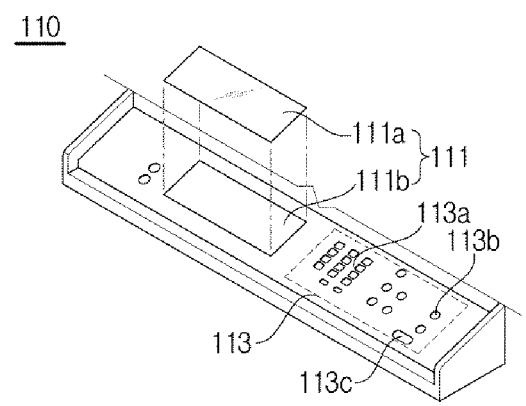
FIG. 4 is a perspective view illustrating a user interface of the image forming apparatus in accordance with an embodiment of the present inventive concept.
Figure 5:
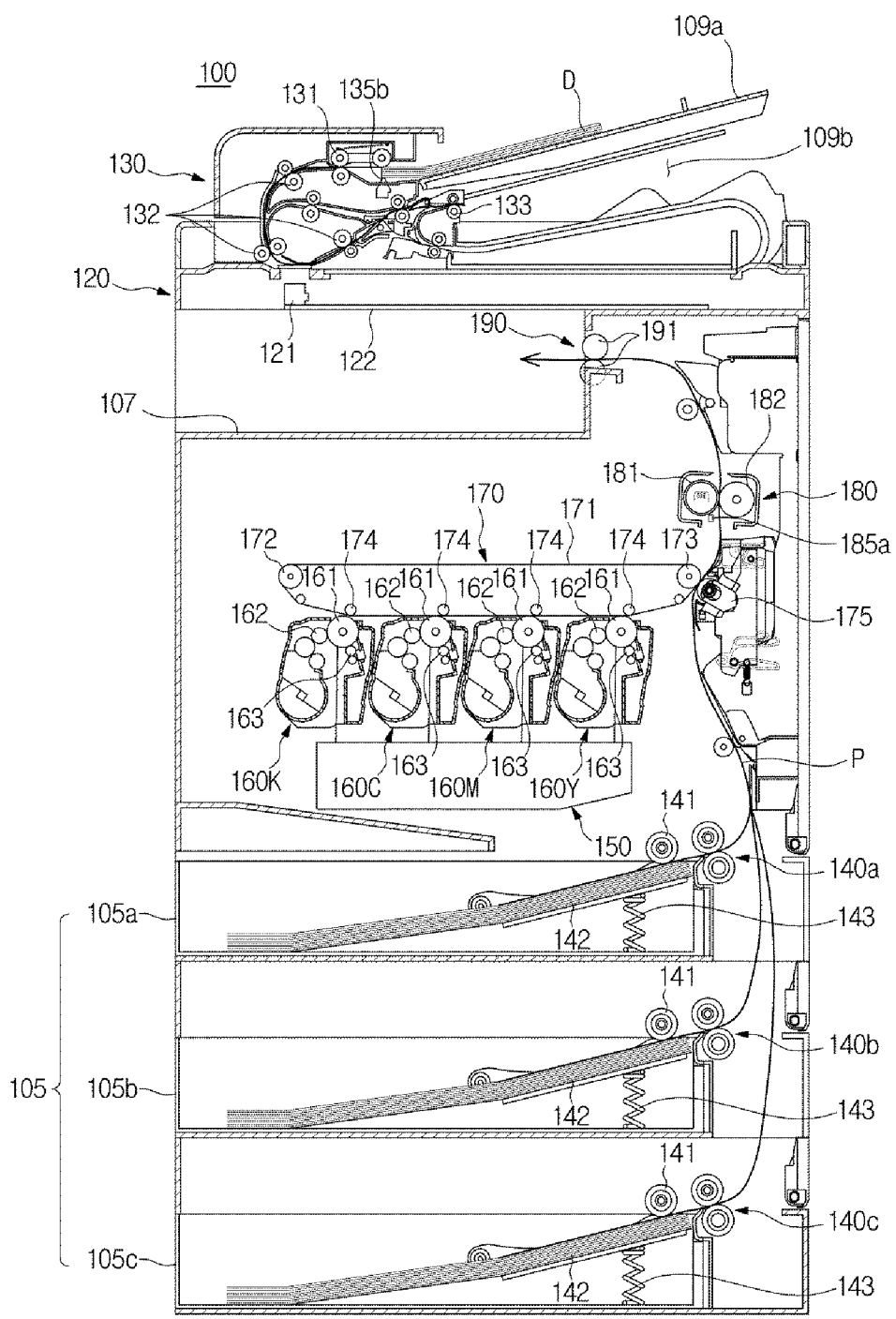
FIG. 5 is a side view illustrating an inside of the image forming apparatus in accordance with an embodiment of the present inventive concept.

FIG. 2 is a block diagram illustrating a control flow of the image forming apparatus 100 in accordance with an embodiment of the present inventive concept. FIG. 3 is a perspective view illustrating an image obtaining unit 120 of the image forming apparatus 100 in accordance with an embodiment of the present inventive concept. FIG. 4 is a perspective view illustrating a user interface 110 of the image forming apparatus 100 in accordance with an embodiment of the present inventive concept. FIG. 5 is a side view illustrating an inside of the image forming apparatus 100 in accordance with an embodiment of the present inventive concept.

Referring to FIGS. 2 to 5, the image forming apparatus 100 may include the user interface 110 configured to receive a manipulation command from a user and to display operation information, the image obtaining unit 120 to obtain an image of the document D, an automatic document supplying unit 130 to automatically supply the document D to the image obtaining unit 120, a document detecting unit 135 to determine whether the document D is inserted, a printing medium supplying unit 140 to supply a printing medium, a light exposing unit 150 to form a latent electrostatic image, a developing unit 160 to develop the latent electrostatic image using a toner, a transferring unit 170 to transfer the developed image to a printing medium P, a fixing unit 180 to fix an unfixed image transferred to the printing medium P on the printing medium P, a fixing temperature detecting unit 185 to detect the temperature of the fixing unit 180, a printing medium exit unit 190 to discharge the printing medium P to which the image is fixed, a driving unit 210 to drive the components included in the image forming apparatus 100, a storing unit 220 to store a program and data related to operations of the image forming apparatus 100, a communication unit 230 to communicate with an outside apparatus (not illustrated), and a control unit 200 to control the operations of the image forming apparatus 100.

As illustrated in FIG. 4, the user interface 110 may include, for example, a Touch Screen Panel (TSP) 111, configured to receive a manipulation command from a user through a touch operation of the user and to display operation information that corresponds to the manipulation command, and a plurality of manipulation buttons 113 configured to receive the manipulation command from the user.

The touch screen panel 111 may include a touch pad 111a, configured to receive a manipulation command from a user through a touch motion of the user, and a display panel 111b to display the operation information according to the manipulation command from the user. The touch pad 111a may employ, for example, a pressure sensitive touch pad and/or a capacitive touch pad, and the display panel 111b may employ, for example, a Liquid Crystal Display (LCD) panel and/or a Light Emitting Diode (LED) panel.

The touch screen panel 111 may be configured to display manipulation commands that a user may be able to select through the display panel 111b, and in response to a user touching a position that corresponds to the manipulation command that the user desires, the touch screen panel 111 may detect the coordinate that is touched through the touch pad 111a. Then, the touch screen panel 111 may compare the coordinate at which the manipulation command is displayed with the coordinate at which the user touched, may recognize the manipulation command that the user inputs, and may provide the manipulation command that has been input to the control unit 200.

The manipulation buttons 113 may include, for example, number buttons 113a, configured to input certain numbers, a power button 113b, configured to supply power or to shut off power to the image forming apparatus 100, and a photocopy button 113c configured to input a photocopy command to the image forming apparatus 100. The manipulation buttons 113 may employ, for example, a membrane switch and/or a touch pad.

The image obtaining unit 120 may be provided at a lower side of the transparent flatbed 103, and may include a scanner 121, configured to obtain an image of the document D by radiating light at the document D and receiving the light reflected from the document D, and a rail 122 to guide the movement of the scanner 121. The scanner 121 may be extended in the direction of an x-axis, and the rail 122 may be extended in the direction of a y-axis, which is perpendicular to the direction of the x-axis, to guide the scanner 121 to move in the direction of the y-axis. The scanner 121, extended in the direction of the x-axis, may move in the direction of the y-axis along the rail 122, and may be able to obtain a two-dimensional image of the document D positioned at the flatbed 103.

The automatic document supplying unit 130 may be provided at the flatbed cover 109, and may include a document pick-up roller 131 to pick up the document D positioned at the document tray 109a, a document delivery roller 132 to deliver the document D, which was picked up, toward the image obtaining unit 120, and a document exit roller 133 to discharge the document D from which an image has been obtained.

In an embodiment in which the document D is inserted into the automatic document supplying unit 130 and the image of the document D is obtained, the scanner 121 of the image obtaining unit 120 may not be moved along the rail 122. That is, while the document D is being delivered by the document delivery roller 132, the document D may be exposed to the scanner 121 of the image obtaining unit 120, and thus the scanner 121 may be able to obtain the image of the entire document D without moving.

The document detecting unit 135 may include a cover opening sensor 135a (see FIG. 3), provided at or near the hinge 109c of the flatbed cover 109 to detect an opening of the flatbed cover 109, and a document inserting sensor 135b (see FIG. 5) provided at an entry of the automatic document supplying unit 130 to detect whether a document D is positioned in the document tray 109a. The cover opening sensor 135a and the document inserting sensor 135b may employ, for example, an infrared light sensor and/or a micro switch.

The printing medium supplying unit 140 may be configured to pick up the printing medium P from the printing medium container 105 (see FIG. 1), which is configured to store different sized recording media, and to move the printing medium P to the transferring unit 170. For example, the printing medium supplying unit 140 may include a first printing medium supplying unit 140a to pick up the printing medium P stored in the first printing medium container 105a, a second printing medium supplying unit 140b to pick up the printing medium P stored in the second printing medium container 105b, and a third printing medium supplying unit 140c to pick up the printing medium P stored in the third printing medium container 105c.

In addition, each of the printing medium supplying units 140a, 140b, and 140c may include a pick-up plate 142 on which the printing medium P may be accumulated, an elastic body 143 configured to elastically support the pick-up plate 142, and a printing medium pick-up roller 141 configured to pick up the accumulated printing medium P at the pick-up plate 142 one by one.

The light exposing unit 150 may be configured to radiate the light that corresponds to the image information received from the communication unit 230, which is described below, or to the image of the document D obtained by the image obtaining unit 120, which is described above, at an outer circumferential surface of an optical photoconducting cartridge (OPC) drum 161, which is described below. As the light exposing unit 150 radiates the light at the charged OPC drum 161, a latent electrostatic image may be formed on the outer circumferential surface of the OPC drum 161.

The light exposing unit 150 may employ, for example, a Laser Scanning Unit (LSU) and/or a LED Print Head (LPH). The Laser Scanning Unit may include a light source that emits light and a mirror rotated by a motor, and may scan light at the OPC drum 161 by reflecting the light radiated from the light source to the rotating mirror. The LED Print Head may be provided with an LED array to radiate line-shaped light directly at the OPC drum 161.

The developing unit 160 may include a first developing unit 160K to develop a latent electrostatic image by using a black toner, a second developing unit 160C to develop a latent electrostatic image by using a cyan toner, a third developing unit 160M to develop a latent electrostatic image by using a magenta toner, and a fourth developing unit 160Y to develop a latent electrostatic image by using a yellow toner. Each of the developing units 160K, 160C, 160M, and 160Y may include a corresponding OPC drum 161, at which a latent electrostatic image may be formed, a corresponding charging roller 163 to charge the OPC drum 161, and a corresponding developing roller 162 to develop the latent electrostatic image by supplying a toner to the OPC drum 161.

The OPC drum 161 may have an outer circumferential surface thereof coated with a photo conductive substance, charged by the charging roller 163, and then subject to exposure by the light exposing unit 150 so that a latent electrostatic image is formed at the outer circumferential surface of the OPC drum 161. Then, as the toner charged by the developing roller 162 is supplied to the outer circumferential surface of the OPC drum 161, the charged toner may be attached to the latent electrostatic image. Thus, the latent electrostatic image may be formed. As described above, as the latent electrostatic image is developed, a visible toner image may be formed at the outer circumferential surface of the OPC drum 161.

The transferring unit 170 may include a transferring belt 171 to transfer a toner image of the OPC drum 161 to the printing medium P, a first transferring roller 174 to press the transferring belt 171 against the OPC drum 161 so that the toner image of the OPC drum 161 is transferred to the transferring belt 171, a driving roller 173 to rotate the transferring belt 171, a tension roller 172 to maintain an elastic force of the transferring belt 171, and a second transferring roller 175 to transfer the toner image, which was transferred to the transferring belt 171, to the printing medium P.

While the transferring belt 171 is being rotated, the toner image of the developing unit 160 may be transferred to the transferring belt 171 by the first transferring roller 174. In detail, the black toner K may be transferred from the first developing unit 160K to the transferring belt 171, the cyan toner C may be transferred from the second developing unit 160C to the transfer belt 171, the magenta toner M may be transferred from the third developing unit 160M to the transfer belt 171, and the yellow toner Y may be transferred from the fourth developing unit 160Y to the transfer belt 171. By combining each of the toner images 'K', 'C', 'M', and 'Y', a color image may be formed on the transferring belt 171, and the color image may be transferred to the printing medium P by the second transferring roller 175.

The fixing unit 180 may include a heating member 181 to heat the printing medium P on which an image has been transferred, and a pressing roller 182 to apply pressure to the printing medium P on which the image has been transferred. The fixing unit 180 may be configured to fix the image, transferred to the printing medium P, to the printing medium P by use of the heat of the heating member 181 and the pressure of the pressing roller 182.

The fixing temperature detecting unit 185 may include a fixing temperature sensor 185a provided adjacent to the heating member 181 to detect the temperature of the heating member 181.

The printing medium exit unit 190 may include a printing medium exiting roller 191 configured to discharge the printing medium P, on which an image may be fixed, to the exit tray 107 of the image forming apparatus 100.

The driving unit 210 may be configured to supply a driving current to drive each of the components included in the image forming apparatus 100 according to a control signal. For example, the driving unit 210 may be configured to supply a driving current to a motor (not illustrated) that moves the scanner 121 of the image obtaining unit 120 along the rail 122, and to supply a driving current to a different motor (not illustrated) that rotates the document pick-up roller 131 of the automatic document supplying unit 130.

The storing unit 220 may include, for example, a magnetic disc and a non-volatile memory (not illustrated) such as a solid state disk that may permanently store a control program and control data to control the operation of the image forming apparatus 100. The storing unit 220 may also include, for example, a volatile memory (not illustrated)

such as Dynamic Random-Access Memory (DRAM) and/or Static Random-Access Memory (SRAM) configured to temporarily store temporary data being generated during a process of controlling the operation of the image forming apparatus 100.

The communication unit 230 may include a wireless communication module (not illustrated) configured to communicate with a portable terminal (not illustrated) through a wireless communication method such as, for example, Wireless Fidelity (WiFi), Bluetooth, Zigbee, Near Field Communication (NFC), and/or a wired communication module (not illustrated) configured to communicate with an outside terminal (not illustrated) through a cable (not illustrated) or a Local Area Network (LAN).

The control unit 200 may be configured to generate a control signal to control the image obtaining unit 120, the automatic document supplying unit 130, the printing medium supplying unit 140, the light exposing unit 150, the developing unit 160, the transferring unit 170, the fixing unit 180, and the printing medium exit unit 190 based on a manipulation command input through the user interface 110 and a detection result of the document detecting unit 135 and the fixing temperature detecting unit 185. The control unit 200 may be configured to provide the control signal to the driving unit 210. For example, in response to detection of an opening of the flatbed cover 109 by the document detecting unit 135 and a photocopy command input through the user interface 110, the control unit 200 may obtain an image of the document D by controlling the image obtaining unit 120, and may cause the image of the document D to be formed on the printing medium P by controlling the printing medium supplying unit 140, the light exposing unit 150, the developing unit 160, the transferring unit 170, the fixing unit 180, and the printing medium exit unit 190.

Above, structures of the image forming apparatus 100 are described. Below, operations of the image forming apparatus 100 are described.

First, operations of the user interface 110 of the image forming apparatus 100 are described.

Figure 6A:
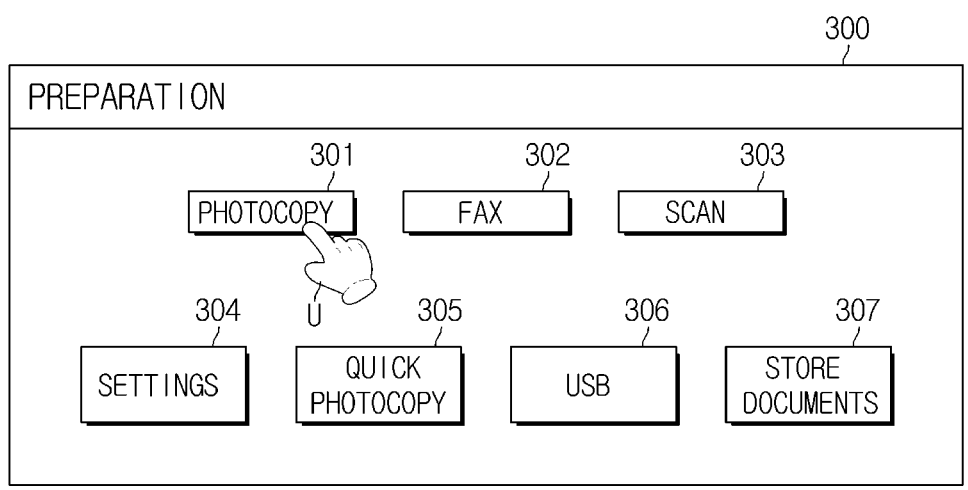
FIG. 6A is a view illustrating a display of a main screen of the user interface of the image forming apparatus in accordance with an embodiment of the present inventive concept.
Figure 6B:
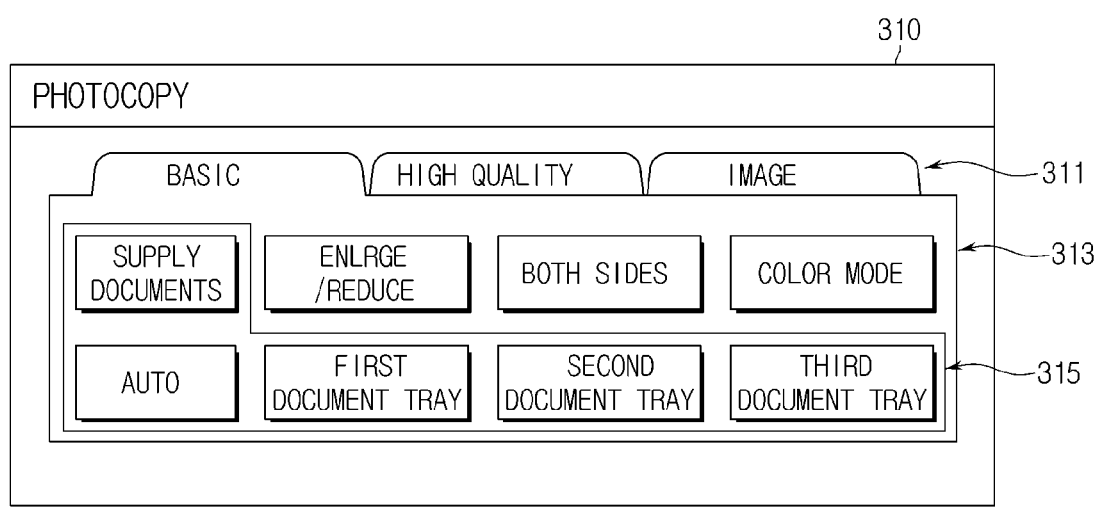
FIG. 6B is a view illustrating a display of a photocopy setting screen of the user interface of the image forming apparatus in accordance with an embodiment of the present inventive concept.

FIG. 6A is a view illustrating a display of a main screen 300 of the user interface 110 of the image forming apparatus 100 in accordance with an embodiment of the present inventive concept. FIG. 6B is a view illustrating a display of a photocopy setting screen of the user interface 110 of the image forming apparatus 100 in accordance with an embodiment of the present inventive concept.

Referring to FIG. 6A, which illustrates a display of the main screen 300 on the touch screen panel 111 (see FIG. 4) of the image forming apparatus 100 The main screen 300 may include a photocopy setting menu 301 configured to input a photocopy setting command to set an option related to the photocopy operations of the image forming apparatus 100, a fax setting menu 302 configured to input a fax setting command to set an option related to the facsimile operations of the image forming apparatus 100, and a scan setting menu 303 configured to input a scan setting command to set an option related to the scan operations of the image forming apparatus 100.

Additionally, the main screen 300 may include a setting menu 304 configured to set setting values related to the operations of the image forming apparatus 100, a quick photocopy menu 305 to enable the image forming apparatus 100 to immediately perform a photocopy operation, a USB menu 306 configured to retrieve an image from an external storage device (not illustrated) through a Universal Serial Bus (USB), and a stored document menu 307 configured to retrieve an image of a document that is stored in the storing unit 220 of the image forming apparatus 100.

In response to a selection by a user of the photocopy setting menu 301 of the main screen 300, the touch screen panel 111 (see FIG. 4) may display the photocopy setting screen 310.

Referring to FIG. 6B, the photocopy setting screen 310 may display a plurality of groups of options that may be set by a user. The photocopy setting screen 310 may include an upper group display domain 311 to display upper option groups, such as, for example, "Basic," "High quality," and "Image", a lower group display domain 313 to display a lower option group that belongs to each of the upper option groups, and a detailed setting display domain 315 to display the detailed setting values that belong to each of the lower option groups.

For example, in response to a user selecting the "Basic" menu from the upper group display domain 311, lower option groups that include, for example, "Supply documents," "Enlarge/Reduce," "Both sides," and "Color mode" that belong to the "Basic" menu may be displayed on the lower group display domain 313. In addition, in response to a user selecting the "Supply documents" menu from the lower group display domain 313, detailed setting values that include, for example, "Automatic," "First document tray," "Second document tray," and "Third document tray" that may be selected by a user may be displayed on the detailed setting display domain 315. A user may be able to select, for example, one of the detailed setting values of the "Automatic," "First document tray," "Second document tray," and "Third document tray" according to characteristics of the document D.

For example, in response to a user selecting the "Color mode" menu from the lower group display domain 313, "Automatic color mode," "Color mode," and "Mono mode" may be displayed on the detailed setting display domain 315, and the user may be able to select one of the detailed setting values that includes the "Automatic color mode," the "Color mode," and the "Mono mode." For example, with a selection of the "Color mode," the image forming apparatus 100 may form a color image on the printing medium P by combining the black toner, the cyan toner, the magenta toner, and the yellow toner. Alternatively, with a selection of the "Mono mode," the image forming apparatus 100 may form a mono image by using only the black toner. With a selection of the "Automatic color mode," the image forming apparatus 100 may form a color image or a mono image depending on whether the obtained image is a color image or a black/white image.

As described above, in response to a photocopy command being input through the photocopy button 113c (see FIG. 4) after setting an option related to a photocopy operation through the photocopy setting menu 301 of the main screen 300, the image forming apparatus 100 may perform the photocopy operation according to the set option.

Operations of the image forming apparatus 100 may be largely divided into an active mode, configured to perform an image forming operation and/or to perform a preparation operation to perform an image forming operation, and a standby mode configured to stand by for an operation command from a user in a case in which an image forming operation has not been performed for a long period of time.

For example, in response to a manipulation command being input from a user through the user interface 110 or in response to an image forming command being received together with image information through the communication unit 230, the image forming apparatus 100 may enter the active mode and may form an image on the printing medium P that corresponds to the image information.

For example, in response to a manipulation command from a user not being input for a predetermined time or longer after the image forming apparatus 100 has formed an image on the printing medium P, the image forming apparatus 100 may enter the standby mode. For example, in a case in which a user inputs a first image forming command through the user interface 110 but inputs no additional command for, for example, about five minutes or longer after the first image forming command has been input, the image forming apparatus 100 may predict that the user may not plan to input an image forming command for a while and, therefore, the image forming apparatus 100 may enter the standby mode to save energy.

During the standby mode, the image forming apparatus 100 may stop the supply of power to some of the components that are included in the image forming apparatus 100. For example, power may stop being supplied to the image obtaining unit 120, the automatic document supplying unit 130, the printing medium supplying unit 140, the light exposing unit 150, the developing unit 160, the transferring unit 170, the fixing unit 180, the printing medium exit unit 190, the driving unit 210, and the storing unit 220. However, power may continue being supplied to the user interface 110 to receive a manipulation command from a user, the communication unit 230 to receive an image forming command through an outside apparatus (not illustrated), the document detecting unit 135 to detect the supply of the document D, and the control unit 200 to control a change of modes.

During the active mode, in a case in which a manipulation command from a user has not been input for a predetermined time or longer, the image forming apparatus 100 may be changed from the active mode to the standby mode. In addition, during the standby mode, in response to a manipulation command being input by a user or in response to a manipulation command being predicted to be input by a user, the image forming apparatus 100 may be changed from the standby mode to the active mode.

Below, the changing of the image forming apparatus 100 from the standby mode to the active mode is described in detail.

Figure 7:
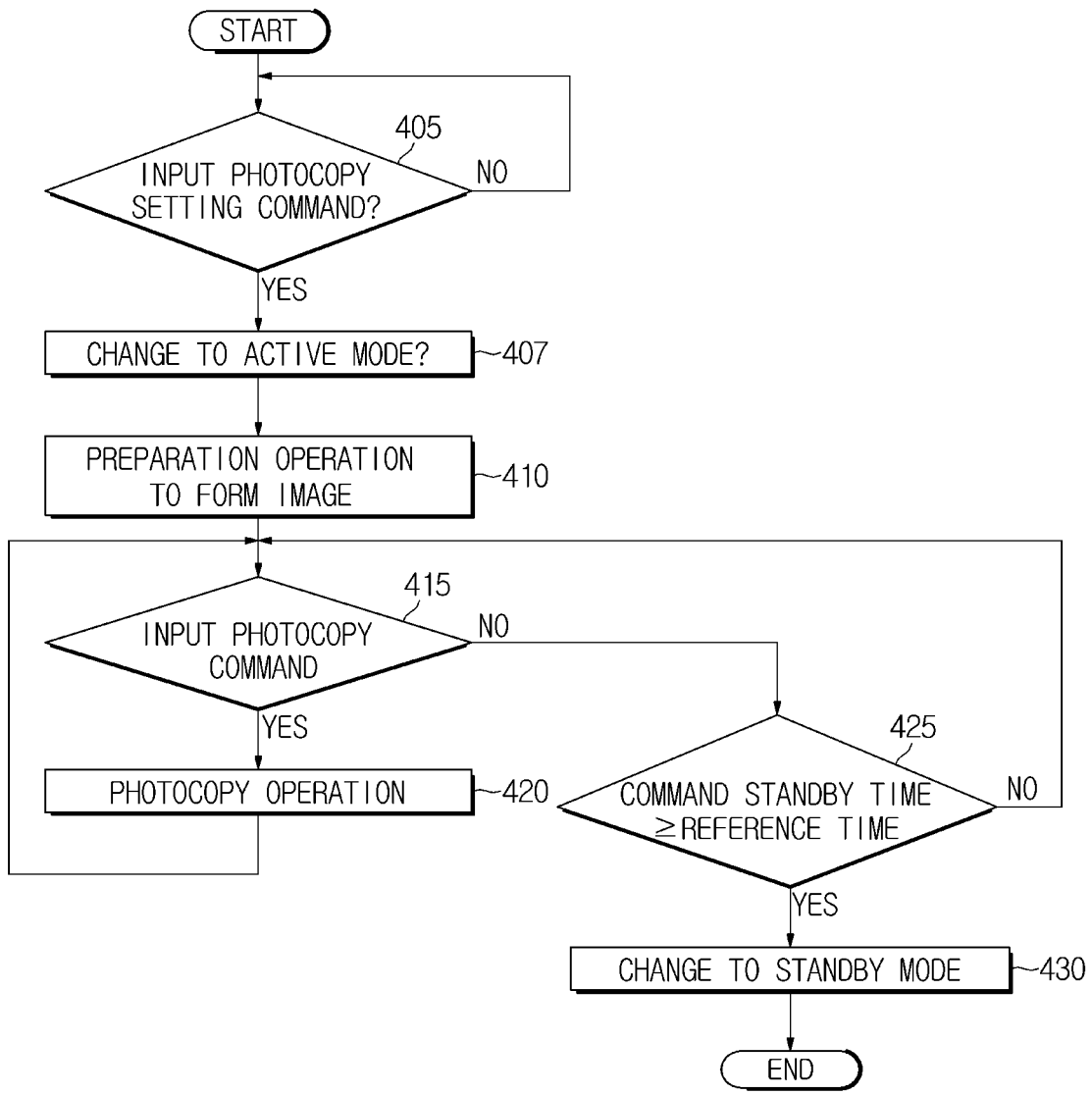
FIG. 7 is a flow chart illustrating an example of a conversion of the image forming apparatus, in accordance with an embodiment of the present inventive concept, from a standby mode to an active mode.

FIG. 7 is a flow chart illustrating an example of a conversion of the image forming apparatus 100, in accordance with an embodiment of the present inventive concept, from a standby mode to an active mode.

Referring to FIG. 7, the image forming apparatus 100 may determine whether a photocopy setting command is input during the standby mode (405).

In response to a photocopy setting command being input during the standby mode ('YES' from 405), the image forming apparatus 100 may be changed to the active mode (407). In response to a photocopy setting command being input when a user touches the photocopy setting menu 301 (see FIG. 6A) provided at the main screen 300 (see FIG. 6A) of the touch screen panel 111 (see FIG. 4), the image forming apparatus 100 may be changed from the standby mode to the active mode. For example, in response to the image forming apparatus 100 being changed to the active mode, the image forming apparatus 100 may resume the supply of power to the image obtaining unit 120, the automatic document supplying unit 130, the printing medium supplying unit 140, the light exposing unit 150, the developing unit 160, the transferring unit 170, the fixing unit 180, the printing medium exit unit 190, the driving unit 210, and the storing unit 220.

Then, the image forming apparatus 100 may perform a preparation operation configured for an image forming operation (410). Even in a case when the image forming apparatus 100 has changed to the active mode, the image forming apparatus 100 may not be able to immediately perform an image forming operation. For example, in order for the image forming apparatus 100 to perform an image forming operation, the fixing unit 180 (see FIG. 5) configured to fix a toner to the printing medium P may need to be at a predetermined level of temperature. Additionally, in a case in which a laser scanning is used as the light exposing unit 150 (see FIG. 5), the motor configured to rotate the reflective mirror may need to be at a predetermined rotation speed. Thus, in order to perform a first image forming operation in a swift manner in response to a photocopy command being input from a user, a preparation operation may be required. The preparation operation may include operations to increase the temperature of the fixing unit 180 (see FIG. 5) to a predetermined level and/or to drive the motor configured to rotate the reflective mirror included in the light exposing unit 150 so that the reflective mirror may be at a predetermined rotation speed (see FIG. 5).

In addition, the image forming apparatus 100 may be able to anticipate, from a photocopy setting command input into the image forming apparatus 100 by a user to set an option related to a photocopy operation, that a photocopy command may soon be input by the user, and thus the image forming apparatus 100 may perform the preparation operation, which is described above, in order to perform the first image forming operation in a swift manner.

The preparation operation of the image forming apparatus 100 is described below.

Next, the image forming apparatus 100 may determine whether a photocopy command is input from a user (415).

In response to a photocopy command being input ('YES' from 415), the image forming apparatus 100 may perform a photocopy operation (420). In other words, in response to a user inputting a photocopy command through the photocopy button 113*c* (see FIG. 4), the image forming apparatus 100 may obtain an image of the document D by using the image obtaining unit 120, may supply the printing medium P by using the printing medium supplying unit 140, may form an image on the printing medium P by using the light exposing unit 150, the developing unit 160, the transferring unit 170, and the fixing unit 180, and may discharge the printing medium P that has the image formed thereon by using the printing medium exit unit 190. Then, the image forming apparatus 100 may again determine whether the photocopy command from the user is input (415).

In response to a photocopy command not being input ('NO' from 415), the image forming apparatus 100 may compare the time elapsed after the photocopy setting command has been input, that is, a command standby time, with a predetermined reference time (425). During this period, the command standby time may be kept initialized when a manipulation command from a user is input. That is, even in a case when a photocopy command is not input by a user, during the period when other manipulation commands, for example, a photocopy setting command, are being input, a user may be anticipated to input the photocopy command, and thus the image forming apparatus 100 may keep the command standby time initialized.

In response to the command standby time being less than the predetermined reference time ('NO' from 425), the image forming apparatus 100 may again determine whether a photocopy command is input by a user (415).

In response to the command standby time being greater than the predetermined reference time ('YES' from 425), the image forming apparatus 100 may complete the preparation operation configured to form an image, and again may be changed to the standby mode (430). In response to a photocopy command not being input by a user within the predetermined reference time after the user sets an option related to the photocopy operation, the image forming apparatus 100 may anticipate that the user may not input a photocopy command for a while. Thus, the image forming apparatus 100 may be changed to the standby mode to save energy.

In other words, because a user usually inputs a photocopy command after setting an option related to a photocopy operation, the image forming apparatus 100 may perform a preparation operation to form an image when a user inputs a photocopy setting command so that the first image forming operation may be performed in a swift manner.

Below, preparation operations to form an image are described.

Figure 8:
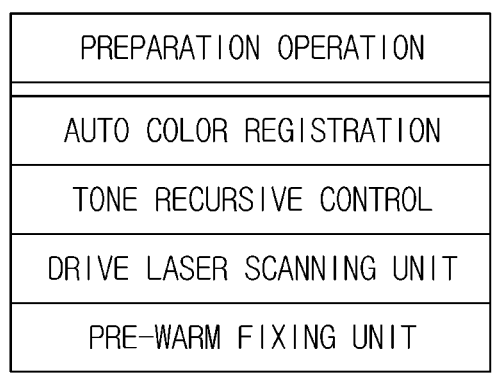
FIG. 8 is a table listing operations that may comprise a preparation operation of the image forming apparatus in accordance with an embodiment of the present inventive concept.
Figure 9:
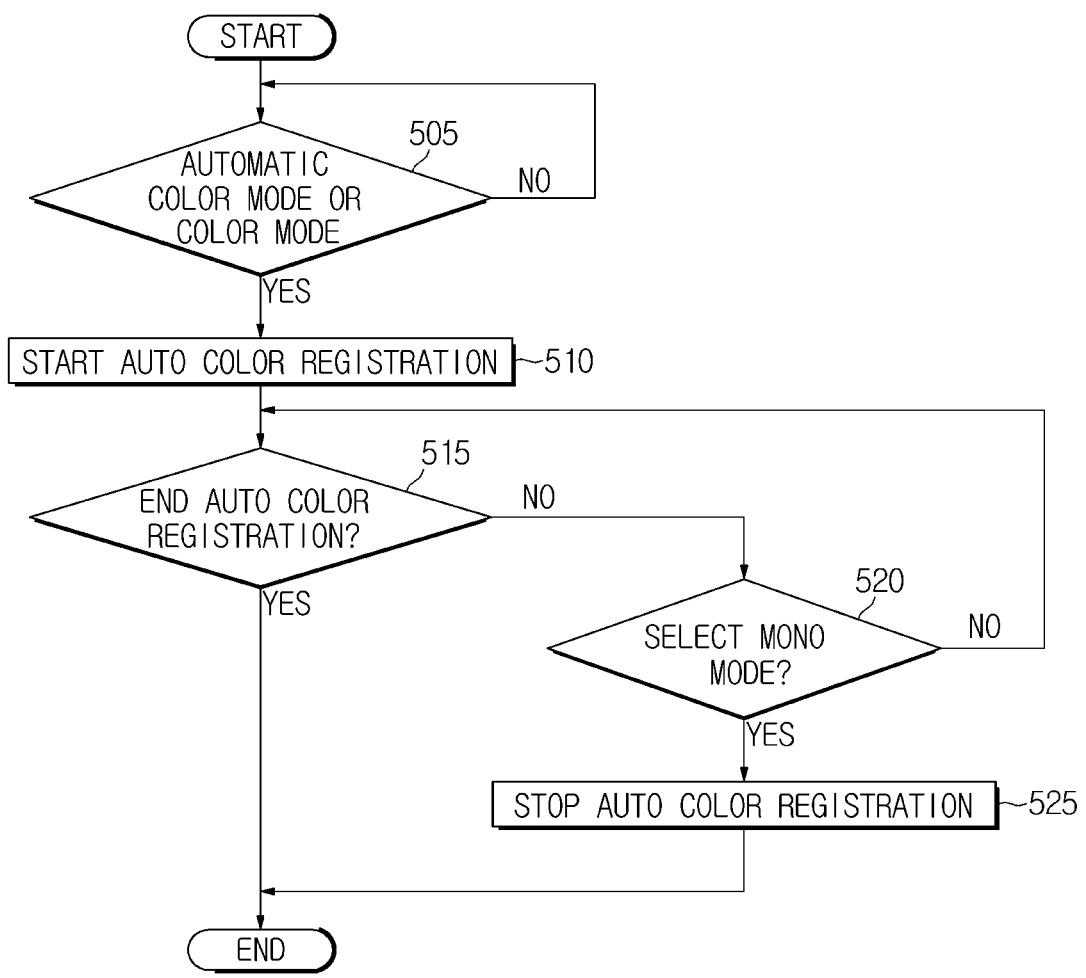
FIG. 9 is a flow chart illustrating an Auto Color Registration operation of the image forming apparatus in accordance with an embodiment of the present inventive concept.

FIG. 8 is a table listing operations that may comprise the preparation operation of the image forming apparatus 100 in accordance with an embodiment of the present inventive concept. FIG. 9 is a flow chart illustrating an Auto Color Registration operation of the image forming apparatus 100 in accordance with an embodiment of the present inventive concept.

Referring to FIG. 8 and FIG. 9, the preparation operation to form an image may include an Auto Color Registration (ACR) operation, a Tone Recursive Control (TRC) operation, a driving operation of a laser scanning unit of the light exposing unit 150, and/or a pre-warming operation of the fixing unit 180.

The Auto Color Registration (ACR) operation may be referred to as an operation to test whether an image formed by the black color, the cyan color, the magenta color, and the yellow color is properly arranged at the transferring belt 171 (see FIG. 5) of the image forming apparatus 100, and in a case in which an abnormality is present, to automatically arrange the black color, the cyan color, the magenta color, and the yellow color. As described above, the image forming apparatus 100 may form a color image by combining a black toner image of the first developing unit 160K (see FIG. 5), a cyan toner image of the second developing unit 160C (see FIG. 5), a magenta toner image of the third developing unit 160M (see FIG. 5), and a yellow toner image of the fourth developing unit 160Y (see FIG. 5). In a case in which the toner image that the each of the developing units 160K, 160C, 160M, and 160Y forms is not properly arranged, an incorrect color image may be formed. To prevent such a situation, the image forming apparatus 100 may perform an Auto Color Registration operation.

For example, the image forming apparatus 100, after transferring the predetermined black color toner image, the cyan color toner image, the magenta color toner image, and the yellow color toner image, by determining whether the each of the toner images is positioned at an arranged position, may determine whether the colors are arranged. In a case in which an abnormality is present, the image forming apparatus 100 may arrange the colors by changing the offset of each of the developing units 160K, 160C, 160M, and 160Y.

The Auto Color Registration operation may be performed to form a color image, and thus the Auto Color Registration operation may be performed during the automatic color mode or the color mode. In a case in which a user selects the mono mode, the image forming apparatus 100 may not need to perform the Auto Color Registration operation.

Referring to FIG. 9 to describe the Auto Color Registration operation of the preparation operation, the image forming apparatus 100 may determine whether the automatic color mode or the color mode is selected by a user (505).

In a case in which the automatic color mode or the color mode is not selected by a user ('NO' from 505), that is, in response to the mono mode being selected by a user, the image forming apparatus 100 may not perform the Auto Color Registration operation.

In a case in which the automatic color mode or the color mode is selected by a user ('YES' from 505), the Auto Color Registration operation may start (510).

While the Auto Color Registration operation is being performed, the image forming apparatus 100 may determine whether the Auto Color Registration operation has been stopped (515).

In a case in which the Auto Color Registration operation has not been stopped (NO' from 515), the image forming apparatus 100 may determine whether the mono mode is selected by a user (520).

In a case in which the mono mode is selected by a user ('YES' from 520), the image forming apparatus 100 may stop the Auto Color Registration operation (525). That is, in response to the mono mode being selected by a user during the Auto Color Registration operation, the image forming apparatus 100 may stop the Auto Color Registration operation. As described above, by stopping or not performing the Auto Color Registration operation for the mono mode, the image forming apparatus 100 may be able to perform the first image forming operation more swiftly.

In a case in which the mono mode is not selected by a user ('NO' from 520), the image forming apparatus 100 may again determine whether the Auto Color Registration operation has been stopped (515).

The Tone Recursive Control operation may be referred to as an operation to determine whether at least one of the developing rollers 162 (see FIG. 5) of the developing unit 160 (see FIG. 2) of the image forming apparatus 100 supplies a toner having a predetermined tone to the corresponding OPC drum 161, and in a case in which an abnormality is present, to readjust the tone of the toner that is being supplied. In a case of the color mode in which the tone of the toner being supplied by at least one of the developing rollers 162 (see FIG. 5) to the corresponding OPC drum 161 (see FIG. 5) is not constant, a toner image that is different from the desired color may be formed after combining the black toner image, the cyan toner image, the magenta toner image, and the yellow toner image. In addition, even in a case of the mono mode in which a difference is present between a predetermined tone and the tone of the toner being supplied by at least one of the developing rollers 162 (see FIG. 5) to the corresponding OPC drum 161 (see FIG. 5), a desired contrast of colors may not be able to be realized.

Thus, the image forming apparatus 100 may perform the Tone Recursive Control operation not only during the color mode and/or the auto color mode, but also during the mono mode.

In a case in which the light exposing unit 150 (see FIG. 5) may include a laser scanning unit, the image forming apparatus 100 may drive the laser scanning unit in advance as an operation of the preparation operation. As described above, the laser scanning unit may radiate light at the OPC drum 161 (see FIG. 5) by using a rotating reflective mirror. During this period, in order to form an even image, the reflective mirror may need to rotate at a predetermined speed. In order for the reflective mirror to rotate at a predetermined speed, the image forming apparatus 100, prior to the image forming operation, may rotate the reflective mirror at the predetermined speed by driving a motor, which may be configured to rotate the reflective mirror.

However, in a case in which the light exposing unit 150 (FIG. 5) may include an LED Print Head, the LED may directly expose light to the OPC drum 161 (see FIG. 5), and thus the preparation operation to drive the LED Print Head may not be necessary.

In addition, the image forming apparatus 100 may pre-warm the fixing unit 180 (see FIG. 5) as an operation of the preparation operation. As described above, in order for the fixing unit 180 (see FIG. 5) to fix a toner image to the printing medium P, heat and pressure are required, and the temperature of the heating member 181 (see FIG. 5) of the fixing unit 180 (see FIG. 5) may need to be increased to a predetermined fixing temperature. For example, assuming that the predetermined fixing temperature is about 150° C. and a general heating member 181 is heated at a speed of about 20° C. per second, approximately six seconds may be consumed for the heating member 181 to reach the predetermined fixing temperature from a room temperature of about 25° C. As described above, the time that is consumed to increase the temperature of the fixing unit 180 (see FIG. 5) may delay the first image forming operation. Thus, the image forming apparatus 100 may pre-warn the fixing unit 180 (see FIG. 5) as an operation of the preparation operation.

However, in a case in which the fixing unit 180 (see FIG. 5) may include an On Demand Fuser (ODF) provided with a high speed of temperature increase, the image forming apparatus 100 may not need to pre-warm the fixing unit 180 (see FIG. 5).

Above, an example of the image forming apparatus 100 changing from the standby mode to the active mode is described.

Below, another example of the image forming apparatus 100 changing from the standby mode to the active mode is described.

Figure 10A:
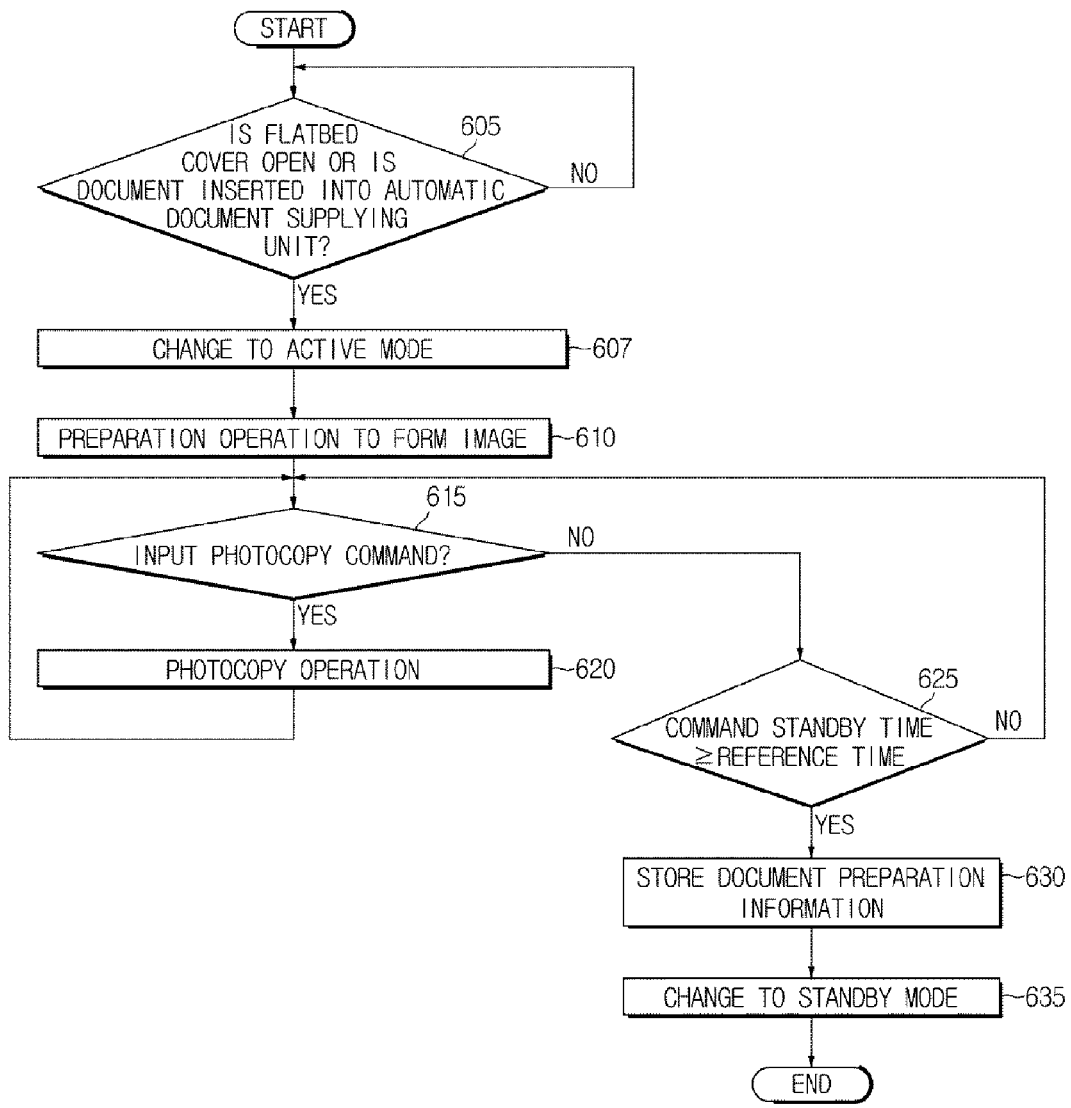
FIG. 10A and FIG. 10B are flow charts illustrating other examples of conversions of the image forming apparatus, in accordance with an embodiment of the present inventive concept, from a standby mode to an active mode.
Figure 10B:
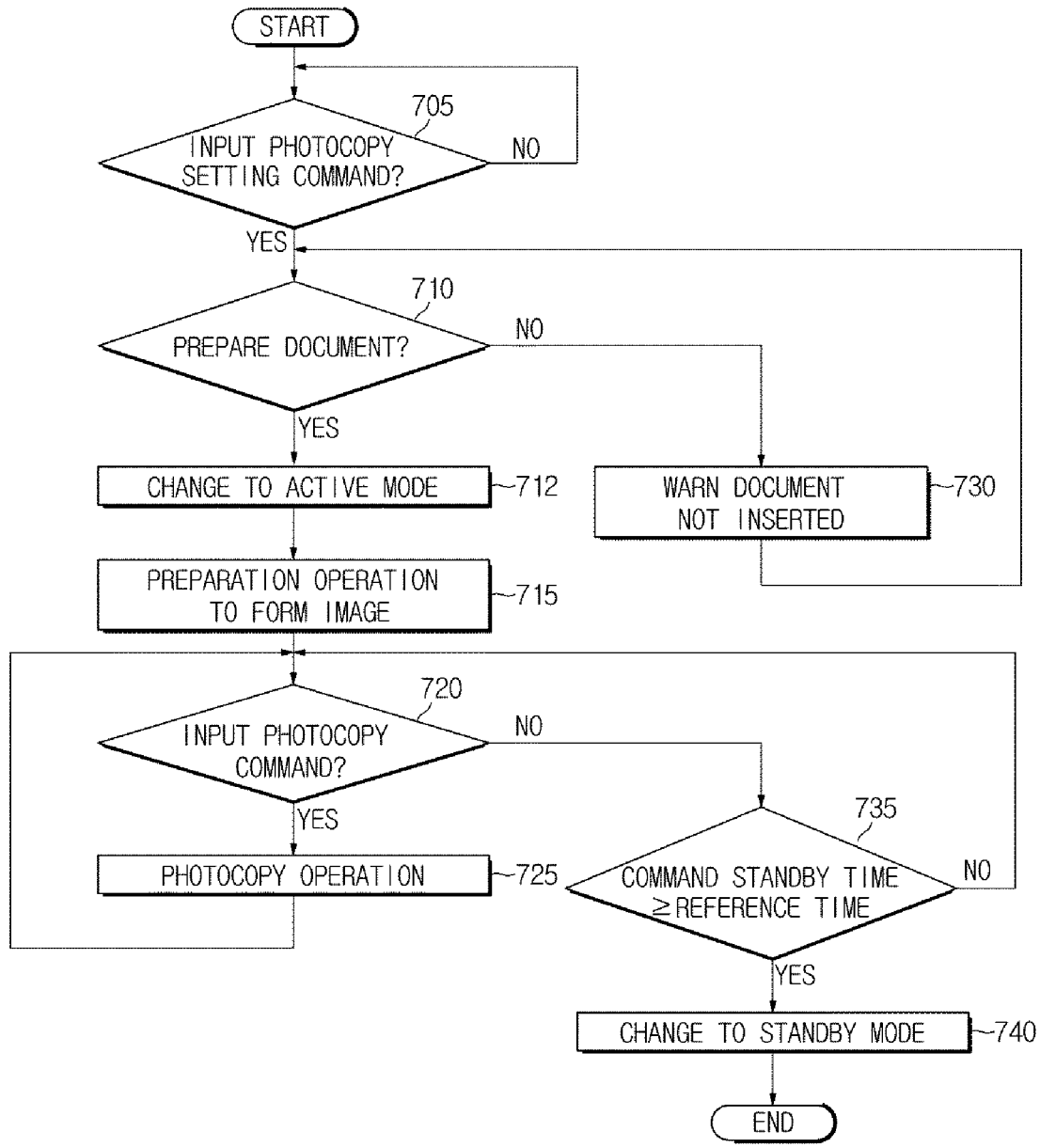

FIG. 10A and FIG. 10B are flow charts illustrating other examples of conversions of the image forming apparatus 100, in accordance with an embodiment of the present inventive concept, from the standby mode to the active mode.

First, referring to FIG. 10A, which illustrates the image forming apparatus 100 changing to the active mode in response to detecting a document D. The image forming apparatus 100 may determine whether during the standby mode the flatbed cover 109 (see FIG. 3) is open or whether a document D is inserted into the automatic document supplying unit 130 (see FIG. 5) (605). For example, the image forming apparatus 100 may be able to determine through the cover opening sensor 135*a* (see FIG. 3) whether the flatbed cover 109 (see FIG. 3) is open, and also may be able to determine through the document inserting sensor 135*b* (see FIG. 5) whether the document D is inserted into the automatic document supplying unit 130 (see FIG. 5).

In a case in which the flatbed cover 109 (see FIG. 3) is open or the document D is inserted into the automatic document supplying unit 130 (see FIG. 5) during the standby mode, the image forming apparatus 100 may change from the standby mode to the active mode (607).

A user may open the flatbed cover 109 (see FIG. 3) in order to position the document D to be photocopied on the flatbed 103 (see FIG. 3). Thus, the image forming apparatus 100 may be able to determine, at a time in which the flatbed cover 109 (see FIG. 3) is open, that the document D is to be positioned on the flatbed 103 (see FIG. 3) and a photocopy command is to be input from a user. In addition, the document D to be photocopied may be conventionally inserted into the automatic document supplying unit 130 (see FIG. 5) by a user. Thus, the image forming apparatus 100 may be able to determine that a photocopy command is to be input from the user.

As described above, in response to the flatbed cover 109 (see FIG. 3) being open or in response to the document D being inserted into the automatic document supplying unit 130 (see FIG. 5), a photocopy command may be predicted to be input from a user. Thus, the image forming apparatus 100 may change from the standby mode to the active mode.

Then, the image forming apparatus 100 may perform a preparation operation to perform an image forming operation (610). As described above, the preparation operation may include the Auto Color Registration operation, the Tone Recursive Control operation, the driving of the laser scanning unit of the light exposing unit 150, and/or the pre-warming of the fixing unit 180.

Then, the image forming apparatus 100 may determine whether a photocopy command is input from a user (615).

In response to the photocopy command being input ('YES' from 615), the image forming apparatus 100 may perform the photocopy operation (620).

In a case in which the photocopy command is not input ('NO' from 615), the image forming apparatus 100 may compare the time elapsed after the flatbed cover 109 (see FIG. 3) has been opened or the document D has been inserted into the document supplying unit 130 (see FIG. 5), that is, the command standby time, with a predetermined reference time (625). During this period, the command standby time may be kept initialized when a manipulation command from a user is input.

In response to the command standby time being less than the predetermined reference time ('NO' from 625), the image forming apparatus 100 may again determine whether a photocopy command is input by a user (615).

In response to the command standby time being greater than the predetermined reference time ('YES' from 625), the image forming apparatus 100 may store information in the storing unit 220 (see FIG. 2), that is, information that indicates that the document D is prepared (630). Depending on situations, the supply of power to the storing unit 220 (see FIG. 2) may be stopped during the standby mode. Thus, the information that indicates that the document D is prepared may be stored in a non-volatile memory.

Next, the image forming apparatus 100 may complete the preparation operation to form an image, and may again change to the standby mode (635).

Referring to FIG. 10B, which illustrates the image forming apparatus 100 changing to the active mode in response to inputting a photocopy setting command. The image forming apparatus 100 may determine whether the photocopy setting command is input during the standby mode (705).

In a case in which the photocopy setting command is input during the standby mode ('YES' from 705), the image forming apparatus 100 may determine whether a document D is prepared (710). Whether the document D is prepared or not may be determined on the basis of whether the flatbed cover 109 (see FIG. 3) is open or whether the document D is inserted into the automatic document supplying unit 130 (see FIG. 5).

For example, the image forming apparatus 100 may determine whether the document D, at the storing unit 220

(see FIG. 2), is prepared to be photocopied. That is, the image forming apparatus 100 may determine whether the document D is prepared, but a photocopy operation has not been performed.

In addition, the image forming apparatus 100 may determine, whether the flatbed cover 109 (see FIG. 3) is open or whether the document D is inserted into the automatic document supplying unit 130 (see FIG. 5) after the photocopy setting command has been input.

In a case in which the document D is not prepared ('NO' from 710), the image forming apparatus 100 may warn a user that the document is not prepared (730).

In a case in which the document D is prepared ('YES' from 710), the image forming apparatus 100 may be changed to the active mode (712).

Then, the image forming apparatus 100 may perform a preparation operation to form an image (715). That is, the image forming apparatus 100, by performing the preparation operation after the document D is prepared, may be able to prevent the preparation operation from being continued until the moment that the document D is prepared.

Next, the image forming apparatus 100 may determine whether the photocopy command is input (720).

In response to the photocopy command being input ('YES' from 720), the image forming apparatus 100 may perform the photocopy command (725).

In a case in which the photocopy command is not input ('NO' from 720), the image forming apparatus 100 may compare the time elapsed after the photocopy setting command has been input, that is, the command standby time, with a predetermined reference time (735). During this period, the command standby time may be kept initialized when a manipulation command from a user is input.

In response to the command standby time being less than the predetermined reference time ('NO' from 735), the image forming apparatus 100 may again determine whether the photocopy command from a user is input (720).

In response to the command standby time being greater than the predetermined reference time ('YES' from 735), the image forming apparatus 100 may complete the preparation operation to form an image, and may again change to the standby mode (740).

In other words, in response to the flatbed cover 109 (see FIG. 3) being open or the document D being inserted into the automatic document supplying unit 130 (see FIG. 5), the image forming apparatus 100 may perform a preparation operation, and in response to the photocopy command not being input, the image forming apparatus 100 may store information that indicates that the document D is prepared. Thereafter, in response to the photocopy setting command being input, the image forming apparatus 100 may determine whether the preparation operation is to be performed depending on whether the document D is prepared.

The present general inventive concept can also be embodied as computer-readable codes on a computer-readable medium. The computer-readable medium can include a non-transitory computer-readable recording medium and a computer-readable transmission medium. The non-transitory computer-readable recording medium is any data storage device that can store data as a program which can be thereafter read by a computer system. Examples of the non-transitory computer-readable recording medium include read-only memory (ROM), random-access memory (RAM), CD-ROMs, magnetic tapes, floppy disks, and optical data storage devices. The non-transitory computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of controlling an image forming apparatus, the method comprising:
    performing a preparing operation for an image forming operation in response to a supply of a document;
    when a user input is not received through an input unit within a reference time interval after the performing the preparing operation, storing supply status information regarding the document and stopping the preparing operation, the supply status information indicating whether the document is supplied to the image forming apparatus;
    determining whether the document is supplied to the image forming apparatus based on the supply status information in response to receiving the user input while the performing of the preparing operation is stopped; and
    performing the preparing operation when it is determined that the document is supplied to the image forming apparatus based on the supply status information.

2. The method of claim 1, wherein:
    the supply status information of the document comprises at least one of whether a flatbed cover is open and whether the document is positioned at a document tray of the document supplying unit.

3. The method of claim 2, wherein:
    the user input comprises a printing medium selection command configured to select a printing medium on which an image is to be formed.

4. The method of claim 2, wherein:
    the user input comprises an enlarge/reduce command configured to input an enlargement command of an image or a reduction command of the image.

5. The method of claim 2, wherein:
    the user input comprises a color mode selection command to choose one of a color mode to form a color image, a mono mode to form a black/white image, and an automatic color mode to automatically form the color image or the black/white image.

6. The method of claim 2, wherein:
    the preparing operation comprises executing an Auto Color Registration (ACR) operation.

7. The method of claim 6, wherein:
    the preparing operation further comprises stopping the Auto Color Registration (ACR) operation in response to a selection of a mono mode configured to form a black/white image.

8. The method of claim 2, wherein:
    the preparing operation comprises executing a Tone Recursive Control (TRC).

9. The method of claim 2, wherein:
the preparing operation comprises driving a Laser Scanning Unit (LSU).

10. The method of claim 2, wherein:
the preparing operation comprises pre-warming a fixing unit.

11. An image forming apparatus, comprising:
an input unit configured to receive a user input;
an image obtaining unit configured to obtain an image of a document;
a document supplying unit configured to supply a document to the image obtaining unit;
an image forming unit configured to form the image on a printing medium;
a storing unit configured to store supply status information of the document, the supply status information indicating whether the document is supplied to at least one of the image obtaining unit and the document supplying unit; and
a controller configured to perform a preparation operation for an image forming operation in response to at least one of supplying the document and receiving the user input,
wherein the controller is configured to:
store the supply status information in the storing unit and stop performing the preparation operation when the user input is not received within a reference time interval after the performing of the preparation operation,
determine whether the document is supplied based on the supply status information in response to receiving the user input while the performing of the preparing operation is stopped, and
perform the preparation operation when it is determined that the document is supplied based on the supply status information.

12. The image forming apparatus of claim 11, wherein:
the supply status information of the document comprises at least one of whether a flatbed cover configured to shield the image obtaining unit from an outside light is open and whether the document is positioned at a document tray of the document supplying unit.

13. The image forming apparatus of claim 12, wherein:
the user input comprises a printing medium selection command configured to select a printing medium on which the image is to be formed.

14. The image forming apparatus of claim 12, wherein:
the user input comprises an enlarge/reduce command configured to input an enlargement command of the image or a reduction command of the image.

15. The image forming apparatus of claim 12, wherein:
the user input comprises a color mode selection command to choose one of a color mode to form a color image, a mono mode to form a black/white image, and an automatic color mode to automatically form the color image or the black/white image.

16. The image forming apparatus of claim 12, wherein:
the controller is configured to perform the preparation operation by executing an Auto Color Registration (ACR) operation.

17. The image forming apparatus of claim 16, wherein:
the controller is configured to stop the Auto Color Registration (ACR) operation in response to a selection of a mono mode configured to form a black/white image.

18. The image forming apparatus of claim 12, wherein:
the controller is configured to perform the preparation operation by executing a Tone Recursive Control (TRC) operation.

19. The image forming apparatus of claim 12, wherein:
the controller is configured to perform the preparation operation by driving a Laser Scanning Unit (LSU).

20. The image forming apparatus of claim 12, wherein:
the controller is configured to perform the preparation operation by pre-warming the fixing unit.

21. A method of converting an image forming apparatus between a standby mode and an active mode, the method comprising:
changing from the standby mode to the active mode and performing a preparation operation for an image forming operation in response to detection of a preparation of a document during the standby mode;
storing supply status information regarding the document and changing from the active mode to the standby mode in response to a lack of a receipt of a user input for a period of time during the active mode, the supply status information indicating whether the document is supplied to the image forming apparatus;
changing from the standby mode to the active mode and making a determination of a preparation of the document based on the supply status information in response to receiving the user input during the standby mode; and
performing the preparing operation in response to the determination of the preparation of the document based on the supply status information.

22. The method of claim 21, wherein the user input includes a photocopy setting command.

23. The method of claim 21, further comprising presenting a warning to a user in response to the determination of the preparation being a lack of preparation.

24. The method of claim 21, wherein the detection of the preparation of the document is a detection that a flatbed cover of the image forming apparatus is open.

25. The method of claim 21, wherein the detection of the preparation of the document is a determination that a detection is inserted into an automatic document supplying unit of the image forming apparatus.

26. A non-transitory computer-readable recording medium containing instructions which, when executed by an electronic control unit, cause the electronic control unit to perform the method of claim 21.

* * * * *